(12) United States Patent
Maffeis

(10) Patent No.: US 7,883,132 B2
(45) Date of Patent: Feb. 8, 2011

(54) PNEUMATIC LINEAR GRIPPER

(75) Inventor: Giuseppe Maffeis, Roncadelle (IT)

(73) Assignee: Gimatic S.p.A., Brescia (IT)

( * ) Notice: Subject to any disclaimer, the term of this patent is extended or adjusted under 35 U.S.C. 154(b) by 1 day.

(21) Appl. No.: 12/354,937

(22) Filed: Jan. 16, 2009

(65) Prior Publication Data

US 2009/0184528 A1    Jul. 23, 2009

(30) Foreign Application Priority Data

Jan. 23, 2008    (IT)    ...................... BS2008A000010

(51) Int. Cl.
*B25J 15/00*    (2006.01)

(52) U.S. Cl. ...................................... 294/88; 294/119.1

(58) Field of Classification Search ................... 294/88, 294/119.1; 269/34, 234
See application file for complete search history.

(56) References Cited

U.S. PATENT DOCUMENTS 7,258,378 B2 *    8/2007    Bellandi et al. ............... 294/88
2009/0278369 A1 *    11/2009    Maffeis ....................... 294/88

* cited by examiner

*Primary Examiner*—Paul T Chin
(74) *Attorney, Agent, or Firm*—McGlew and Tuttle, P.C.

(57) ABSTRACT

A linear pneumatic gripper including a gripper body (11) with a chamber (15), a piston (12) moving alternately in the chamber (15) and a pair of sliding gripper jaws (13) associated with and moving in opposite directions with the piston, and where the gripper body (11) is made up of two elements (14), or identical shells, joined face to face to form at the same time the chamber (15) for the piston (12) and the slide guides (16) for the jaws (13), and the piston (12) is in particular integral with the translation devices (22) for the movements of the jaws of the grippers in opposite directions.

20 Claims, 3 Drawing Sheets

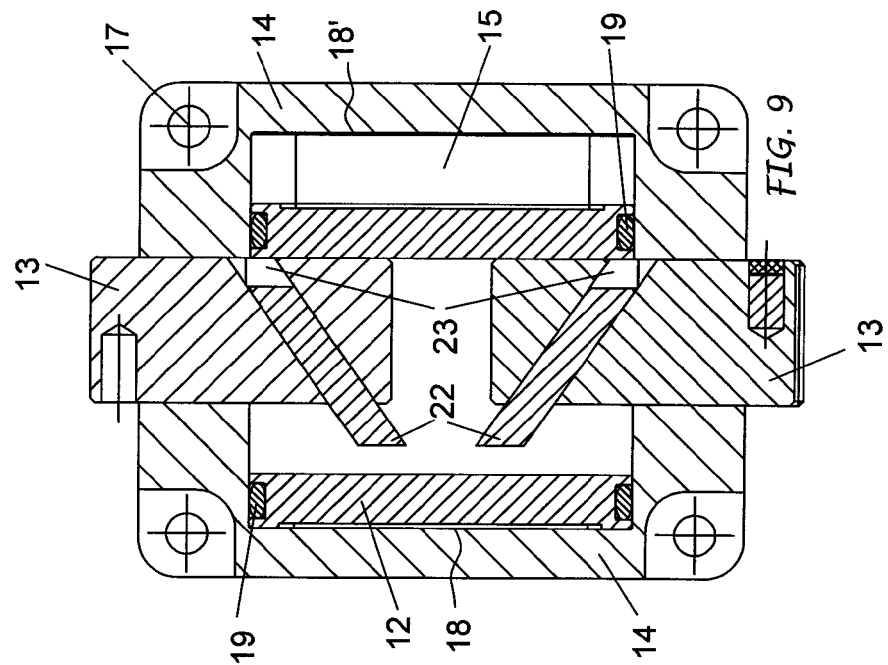
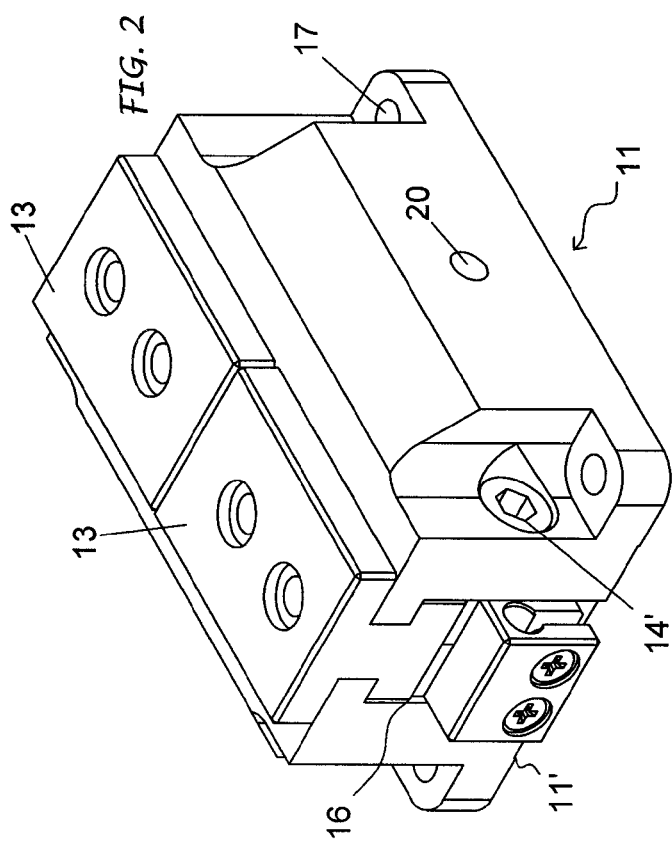
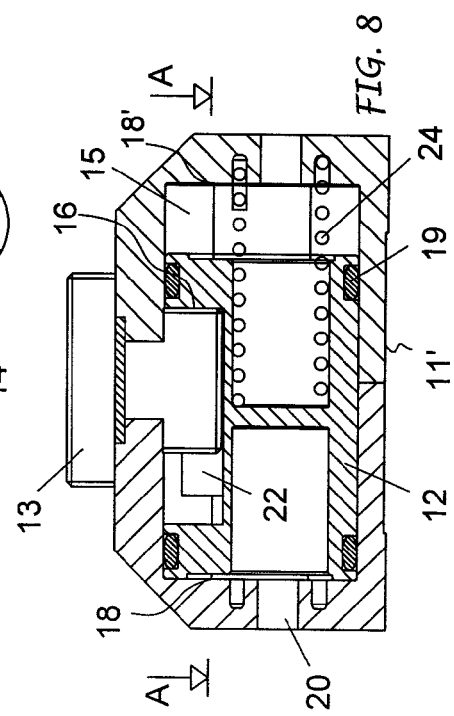

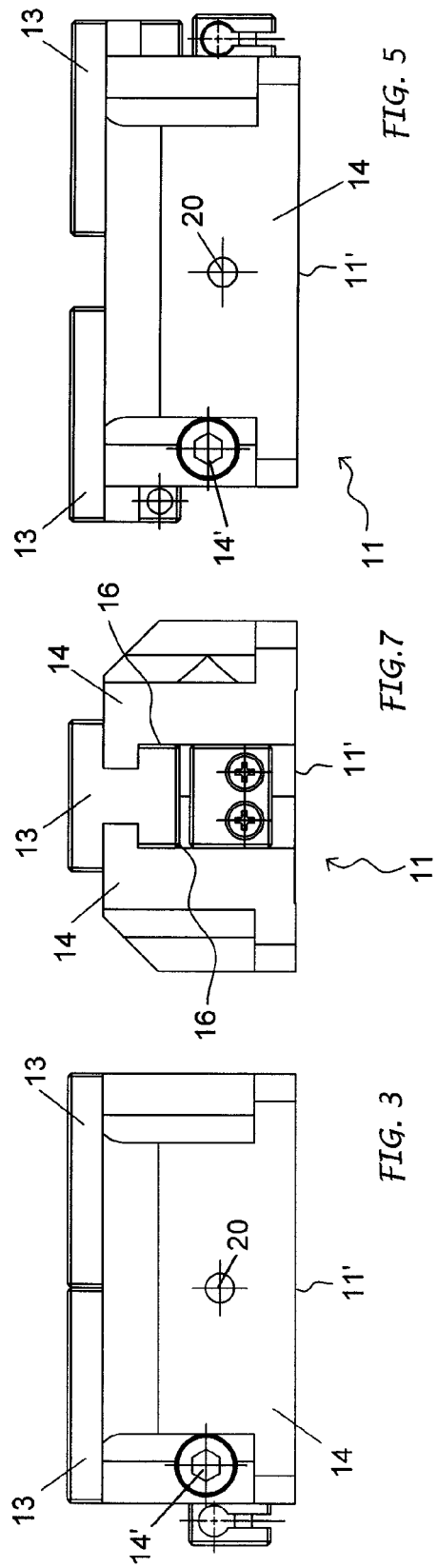
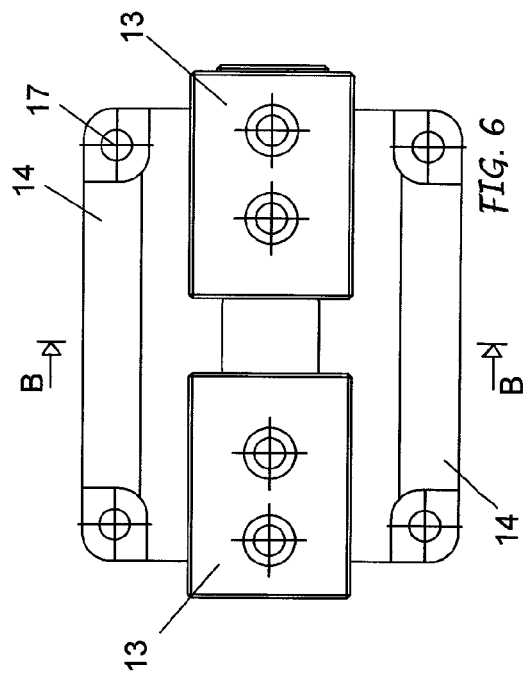
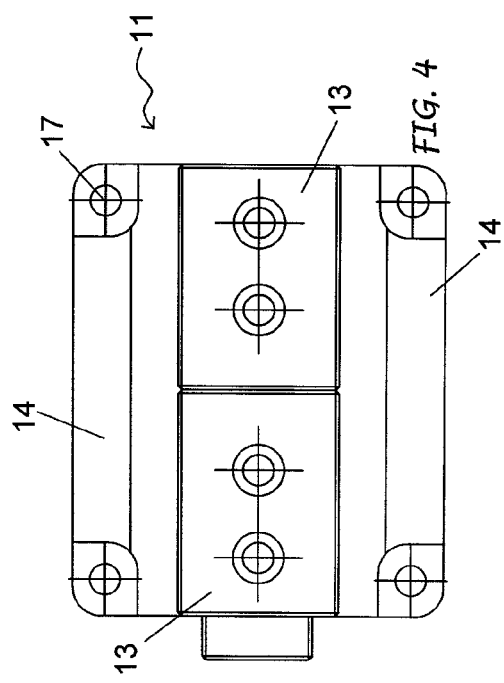

PNEUMATIC LINEAR GRIPPER

FIELD OF THE INVENTION

This invention concerns, in general, the pneumatic grippers for gripping various items, objects or bodies during production and/or handling and/or use, and refers in particular to a pneumatic gripper provided with a pair of jaws movable linearly in opposite directions when opening or closing by means of a single or double-acting control piston.

STATE OF THE TECHNIQUE

The type of linear pneumatic grippers taken into consideration can have various configurations, dimensions and capacity. They comprise basically one gripper body defining a chamber, a piston positioned and moving alternately in said chamber moved by a fluid under pressure, and a pair of gripper jaws associated with said body and piston and moving in opposite directions.

Nevertheless, the known linear grippers are relatively cumbersome and heavy besides being complicated to make. They have usually a series of elements that are made and then assembled causing additional assembly and labour costs and due to their combination they may cause faults in the function of the gripper. In fact, the body of the gripper requires at least a process or an insert to form the chamber for the piston and the support of guide means for the jaws. Furthermore, possible dimensional errors of the individual components and/or coupling tolerances may also have a perceptible influence on the precision, movement parallelism and action of the jaws.

OBJECTIVE AND SUMMARY OF THE INVENTION

One objective of this invention is to avoid the abovementioned drawbacks and disadvantages, and therefore to provide a pneumatic linear gripper made up of a limited number of components and where some components are configured to carry out a dual function.

A further objective of the invention is to provide a pneumatic linear gripper the assembly of which is very simplified and whose dimensions are much reduced compared to the same kind of grippers, thanks to a particular configuration of the piston and the translation means of the jaws.

Said objectives are reached with a pneumatic linear gripper according to the preface of claim 1, where the body of the gripper is made up of two elements or identical shells, joined face to face and forming at the same time the chamber for the piston and the slide guides for the two jaws, and where the piston is associated, in particular integral, with the translation means of the gripper in opposite directions.

The piston, quite apart from its length, even if it could be cylindrical, will then have the advantage of having a dimension in width greater than its dimension in height so as to have an elliptic, polygonal or, better still, rectangular section, a condition that enables the dimensions of the gripper, at least above its base, to be reduced, power being equal.

In this way the gripper is in effect made up of a minimum number of components: only a gripper body, a pneumatic piston, and jaws, of being simple, easy and quick to assemble. In fact, the gripper body, which in itself physically forms the chamber for the piston and the guides for the jaws, no longer requires any additional guide elements. In the same way, the piston which is integral with the driving means of the jaws, excludes the need for interposition of additional elements between the piston and the jaws for the opening and closing movements of the same, as is required in the known technique. In addition the functional components of the gripper can be produced by sintering, with an optimal degree of finishing, basically not requiring important machining work.

BRIEF DESCRIPTION OF THE DRAWINGS

This invention will however be illustrated in greater detail in the continuation of this description made in reference to the enclosed indicative and not limiting drawings, in which:

FIG. 2 is a view of the assembled gripper in perspective;

FIGS. 3 and 4 are lateral and top views respectively of the gripper with the jaws closed;

FIGS. 5 and 6 are the lateral and top views respectively of the gripper with the jaws open;

FIG. 7 is front view of the gripper;

FIG. 8 is a sectional view of the gripper according to arrows A-A in FIG. 6; and FIG. 9 is a sectional view parallel to the base of the gripper according to arrows B-B in FIG. 8.

DETAILED DESCRIPTION OF THE INVENTION

Figure 1:
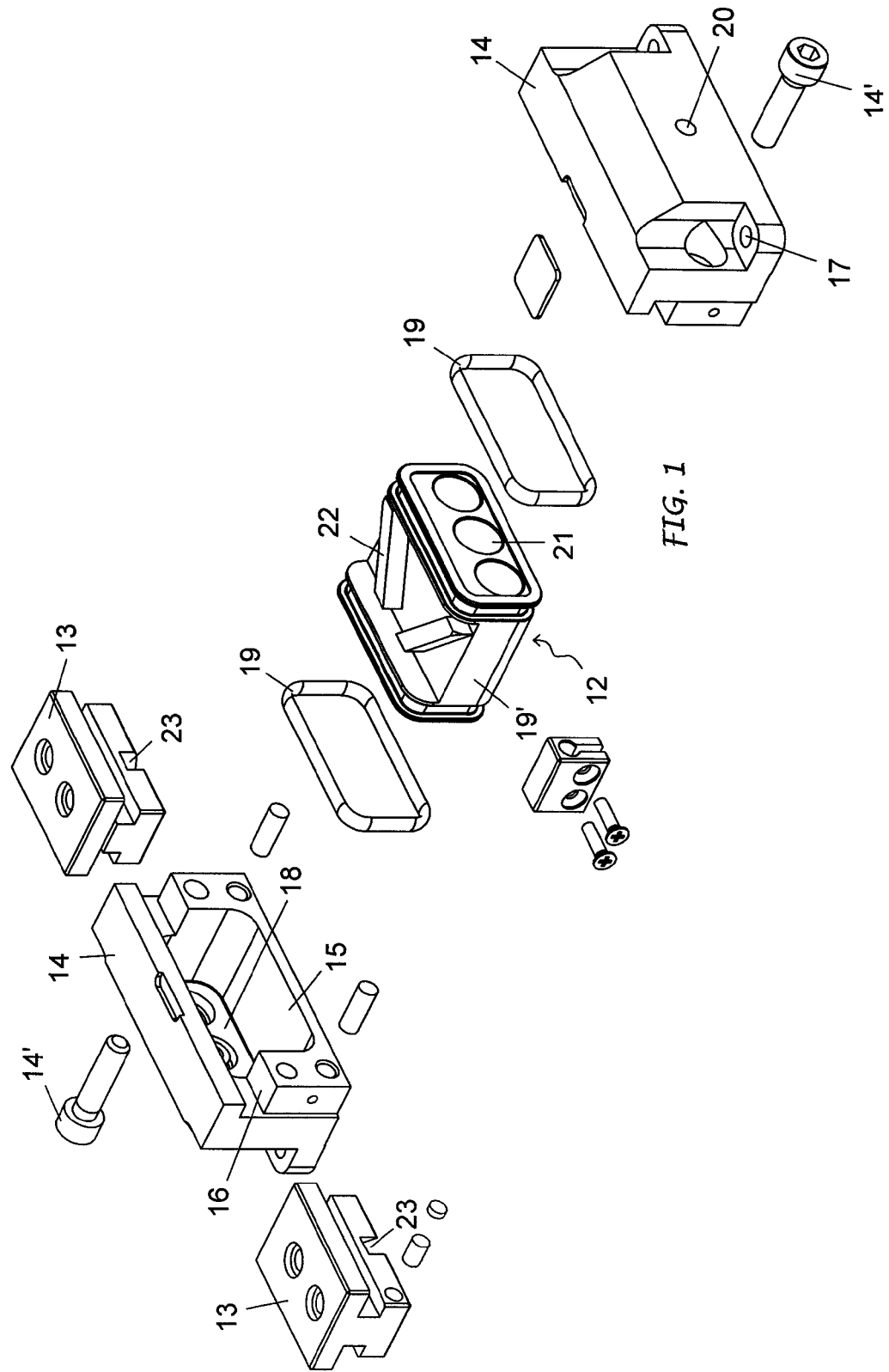
FIG. 1 is an exploded view in perspective of the components of the gripper according to the invention.

As shown, the linear pneumatic gripper basically comprises a gripper body 11, a pneumatic piston 12, single or double-acting, and two shoes 13 provided to hold the gripper jaws.

The gripper body 11 is made up of two elements 14, or symmetric shells, which can be equal and which, joined side by side and fixed together using mechanical elements 14', such as screws or the like, form at the same time a chamber 15 for the piston 12 and slide guides 16 for the jaws 13. The gripper body 11 has on the outside means 17 for fixing the gripper to supports or manipulators.

Said chamber 15 extends at right angles to the sliding direction of the jaws 13 between two stop surfaces 18, 18', even if on different planes.

The pneumatic piston 12 is housed and moves in the range of stop surfaces 18, 18' in said chamber 15, it can have a section of any shape, round, elliptic, but preferably polygonal, better if rectangular so that its size in width can be more than its size in height. It is equipped as is usual with a seal 19 and can have lateral planes 19' for centring and guide purposes inside the chamber 15. All this so as to reduce, at least in height as stated above, the dimensions of the gripper in regard to the supporting base 11' of its body.

The pneumatic piston 12, even if it may be double-acting, in the example illustrated it is single acting and its alternating movement is caused, in one direction, by a fluid under pressure fed to the chamber 15 by means of a feed hole 20 present in a wall of the gripper body 11, and in the opposite direction by at least one return spring 24 that is positioned between the piston 12 and a stop surface 18' in the chamber 15, the piston 12 being able to be provided with at least a seat 21 for a spring. The piston 12 furthermore has, on one of its faces, translating means 22 integral with it, which can be in the of ribs, which rise towards the jaws 13 and converge in the direction of the movement of the piston 12 towards the closing position of the jaws 13.

The slide guides 16 for the jaws 13 are in the form of longitudinal grooves on the facing sides of the two elements or half-shells 14 forming the gripper body The two jaws 13 are held and able to slide longitudinally in said guides 16 and for this purpose they have sloping grooves 23 corresponding to the translating means 22 and they join with these means so that the linear movements in opposite directions for opening and closing the jaws 13 correspond to the alternating movements of the piston inside the chamber 15.

The invention claimed is:

1. A pneumatic linear gripper, comprising:
   a gripper body with a chamber;
   a piston moving alternately in the chamber in said body under the action of a fluid under pressure; and
   a pair of sliding jaws associated with said gripper body and with said piston, said piston engaging with the jaws through translation means so that the alternating movements of the piston correspond to linear movements, in opposite directions, of the jaws to open and close said jaws, said gripper body being composed of two equal elements or shells, said two equal elements or shells being joined face to face to form said chamber for the piston and to form slide guides for the jaws, said piston being integrally connected with the translation means for movement of the jaws in opposite directions.

2. Pneumatic linear gripper according to claim 1, wherein the piston has a section with a shape having a dimension of width that is greater than a height thereof, said piston having a basically polygonal section, in particular rectangular.

3. Pneumatic linear gripper according to claim 1, wherein the translation means is in the shape of converging ribs, which develop upwards from one side of the piston and engage with converging grooves in the same direction as said translation means.

4. Pneumatic linear gripper according to claim 1, wherein each element, or shell, forms a half-chamber for the piston and a slide guide for one side of the jaws, the slide guide being in the shape of a longitudinal groove provided in the internal face of said element.

5. Pneumatic linear gripper according to claim 1, wherein said chamber in the gripper body and said piston have lateral planes for reciprocal centering and guides.

6. Pneumatic linear gripper according to claim 1, wherein the piston is single acting, movable in one direction by means of a fluid, in particular compressed air, and in an opposite direction by means of at least a return spring, said spring being able to find at least partial housing in at least a seat provided in the piston.

7. Pneumatic linear gripper according to claim 1, wherein the piston is double acting moving alternately by means of a fluid, in particular compressed air, fed by said chamber.

8. A pneumatic linear gripper, comprising:
   a gripper body comprising two body elements, one of said body elements engaging another one of said body elements, wherein said two body elements define a chamber and a plurality of slide guides;
   a piston mounted for movement in said chamber such that said piston moves alternately in said chamber via a fluid under pressure; and
   a plurality of jaws associated with said gripper body and said piston, each of said jaws being movably mounted such that each of said jaws is movable along one of said slide guides, said piston comprising a translation means for converting said alternating movement of said piston into linear movement of said plurality of jaws such that each of said plurality of jaws moves in direction opposite said another one of said plurality of jaws, said translation means being integrally connected to said piston, said piston being connected to each of said jaws via said translation means.

9. A pneumatic linear gripper according to claim 8, wherein a dimension of a width of said piston is greater than a dimension of a height of said piston, said piston having a rectangular shape.

10. A pneumatic linear gripper according to claim 9, wherein the translation means is in the shape of converging ribs, which develop upwards from one side of the piston and engage with converging grooves in the same direction as said translation means.

11. A pneumatic linear gripper according to claim 9, wherein said translation means comprises a plurality of converging strips, each of said plurality of converging strips being integrally connected to a surface of said piston, each of said jaws comprising converging grooves, each of said converging grooves extending in the same direction as one of said strips.

12. A pneumatic linear gripper according to claim 1, wherein each of said body elements forms a portion of said chamber and a portion of one of said slide guides for one side of the jaws, said one of said slide guides being a longitudinal groove provided in an internal face of one of said body elements.

13. A pneumatic linear gripper according to claim 9, wherein said chamber in the gripper body and said piston have lateral planes.

14. A pneumatic linear gripper according to claim 9, further comprising:
   a return spring, wherein said piston is a single acting piston, said single acting piston being movable in a first direction via the fluid, said single acting piston being movable in a second direction via at least said return spring, said first direction being opposite said second direction, said piston comprising a seat, one end of said return spring engaging said seat.

15. A pneumatic linear gripper according to claim 9, wherein said piston is a double acting piston, wherein said double acting piston moves alternately via said fluid, said fluid being compressed air.

16. A pneumatic linear gripper, comprising:
   a gripper body comprising a first body element and a second body element, said first body element being in contact with said second body element, said first body element being opposite said second body element, wherein said first body element and said second body element define a chamber and at least one slide guide;
   a piston mounted for movement in said chamber such that said piston moves alternately in said chamber via a fluid under pressure;
   a first jaw associated with said gripper body and said piston;
   a second jaw associated with said gripper body and said piston, said first jaw being movably mounted such that at least a portion of said first jaw is movable along a first portion of said at least one slide guide, said second jaw being movably mounted such that at least a portion of said second jaw is movable along a second portion of said at least one slide guide, said first portion of said at least one slide guide being different from said second portion of said at least one slide guide, said piston comprising a translation means for moving said first jaw and said second jaw in a linear direction when said piston moves alternately in said chamber such that said first jaw moves in a direction opposite said second jaw, said translation means being integrally connected with said piston, said piston being connected to said first jaw and said second jaw via said translation means.

17. A pneumatic linear gripper according to claim 16, wherein a dimension of a width of said piston is greater than a dimension of a height of said piston, said piston having a rectangular shape.

18. A pneumatic linear gripper according to claim 16, wherein the translation means is in the shape of converging ribs, which develop upwards from one side of the piston and engage with converging grooves in the same direction as said translation means.

19. A pneumatic linear gripper according to claim 9, wherein said translation means comprises a first strip and a second strip, said first strip and said second strip being integrally connected to a surface of said piston, said first jaw comprising a first groove, said second jaw comprising a second groove, said first groove extending in the same direction as said first strip, said second groove extending in the same direction as said second strip.

20. A pneumatic linear gripper according to claim 19, wherein a distance between one end of said first strip and one end of said second strip is less than a distance between another end of said first strip and another end of said second strip.

\* \* \* \* \*